Aug. 18, 1942.   H. B. WARREN   2,293,523
WELDING ELECTRODE
Filed July 14, 1939
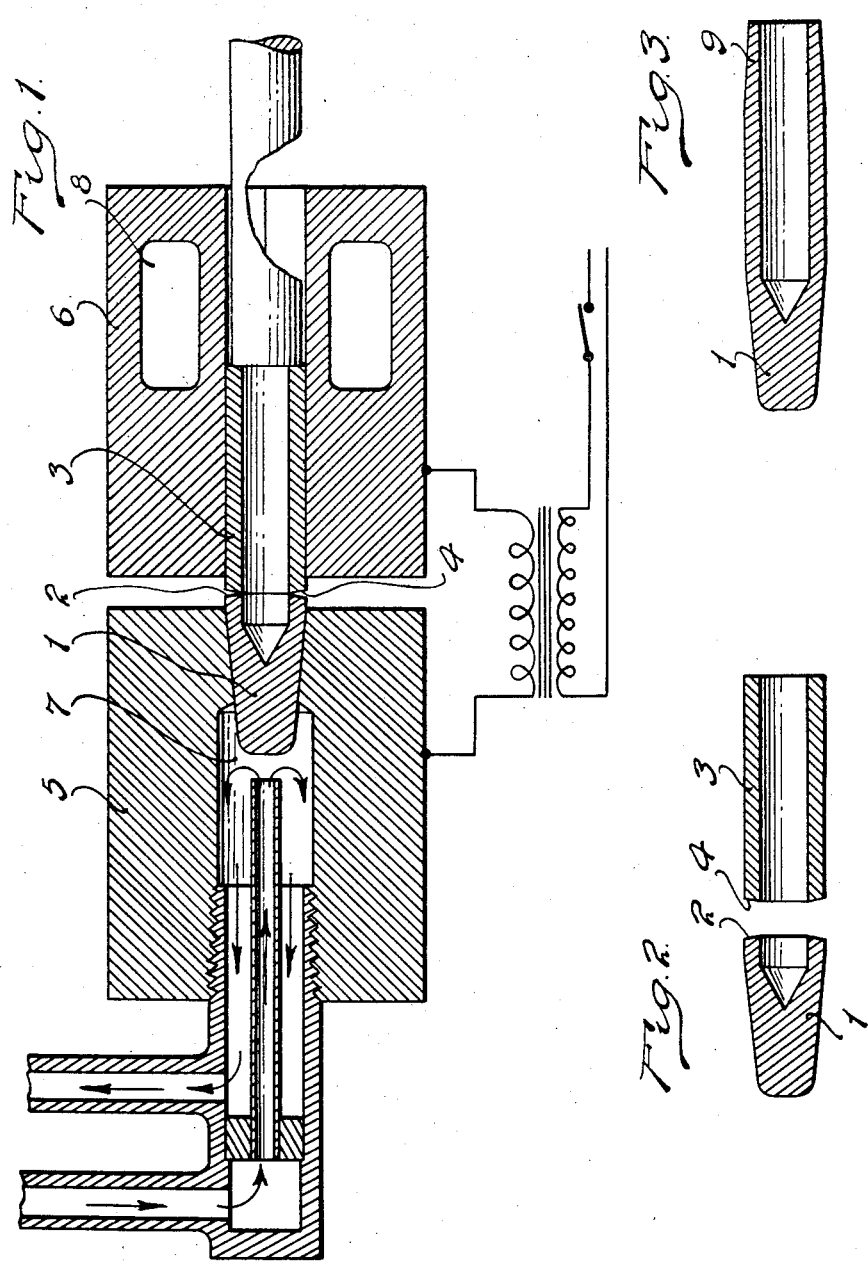
INVENTOR.
HAROLD B. WARREN.
BY
Barnes, Kisselle, Laughlin & Reisch
ATTORNEYS.

Patented Aug. 18, 1942

2,293,523

UNITED STATES PATENT OFFICE 2,293,523

WELDING ELECTRODE

Harold B. Warren, Cincinnati, Ohio, assignor to General Motors Corporation, Detroit, Mich., a corporation of Delaware Application July 14, 1939, Serial No. 284,405

2 Claims. (Cl. 219—10)

This invention relates to welding electrodes and the method of making the same. Welding electrodes which will stand the pounding of modern welding operations have to be made of expensive copper alloys. Copper is the most satisfactory welding electrode from the standpoint of conductivity but it is relatively soft and the tip of the electrode soon mushrooms due to the number of operations that are now utilized especially in repeat welding or in successive welding with a large number of electrodes on a single piece of work.

It is old to provide removable electrode tips which are usually screwed into the shank of the electrode. But these are ordinarily made by machining operations from bar stock and considerable waste of expensive alloys takes place in machining the outside of the tip and drilling the inside of the tip for the cooling water.

It is the object of the present invention to afford an electrode better than the screw-in tip and save the waste which occurs in the manufacture of such tips.

In the drawing:

Fig. 1 is a sectional view showing the electrode tip and shank being welded together.

Fig. 2 is a longitudinal section of the tip and shank before they are united.

Fig. 3 is a longitudinal sectional view of the electrode after it has been completed.

A tip 1 instead of being machined as is the customary practice is coined or forged from a block of an appropriate size so that no waste takes place. It is coined with a slight chamfer 2 on the large end. This tip is made of a copper alloy which may be, for instance, copper, chromium and silicon, or copper, nickel and silicon, and there are various other alloys that may be used.

The shank 3 is simply a piece of relatively heavy gauge seamless tube. This is cut with a chamfer 4 at the end which is to abut the end of the tip. This shank can be substantially pure copper or an inexpensive alloy. Pure copper is the more desirable material for the electrode as it presents less electrical resistance than the alloys. The chamfer is used on the element which is a low resistance material, but this is a routine practice in electric resistance butt-welding.

The tip 1 and the shank 3 are mounted in a pair of welding dies or electrodes 5 and 6. The tapered tip 1 fits into its electrode tightly enough so that it can project directly into the water cooling chamber 7 of the electrode and yet substantially seal the chamber so that a water leak will not occur. This brings the cooling water directly into contact with the electrode.

The split electrode 6 has a chamber 8 which may be water cooled. Of course, with this arrangement, the cooling water will ordinarily have to be turned on and off after each welding operation but this may be easily done. The electrodes are caused to approach each other and the chamfered ends of the tip and shank come together and are butt welded. After the welding operation, the burr, if any, is ground off and the open end of the electrode is machined as at 9 to give it a slight taper so that it can be driven into the electrode supporter.

The coining of the tip portion out of copper alloy such as that mentioned above, forms a compact, tough and hard tip calculated to withstand wear under the hard usage encountered by an electrode. In welding a copper alloy to copper, obviously very large amperage current is required as the material is a very good conductor and will consequently not overheat and reach a welding temperature unless a very large current is produced. It is also desirable to have the contact a relatively small one to initiate a weld as this promotes the heating up of the work and the weld. This small contact is achieved by chamfering both the end of the shank and the end of the tip where they abut. By water cooling the tip as shown in the drawing, this serves to prevent the annealing of the material of the tip and the destruction of the hardness and toughness of the copper alloy which would otherwise take place by reason of the heating of the tip during the welding operation.

I claim:

1. The method of making an electrode which comprises the stamping of a block of semi-precious metal comprising a copper alloy to form a tapered welding tip recessed at one end and having the end of wall around said recess chamfered and the welding of a piece of less precious copper tubing having a chamfered end to the chamfered end of the tip with the said tip cooled by water circulating in contact with the tip.

2. The method of constructing a welding electrode which comprises coining a recessed tip portion out of a semi-precious copper alloy of substantial hardness and toughness, the welding of the tip end with a hollow copper shank portion by means of a current of great amperage but with a tip water cooled to preserve the hardness and toughness of the copper alloy in the tip, the said meeting ends of the tip and shank before welding being inclined or chamfered to present a substantial line contact when butted to initiate the welding and thereby facilitate the heating of the material.

HAROLD B. WARREN.